United States Patent [19]
Ackley

[11] 3,827,724
[45] Aug. 6, 1974

[54] COUPLING DEVICE
[75] Inventor: John William Ackley, Moline, Ill.
[73] Assignee: Deere & Company, Moline, Ill.
[22] Filed: Feb. 16, 1973
[21] Appl. No.: 333,315

[52] U.S. Cl............................ 280/511, 280/479 A
[51] Int. Cl............................................... B60d 1/04
[58] Field of Search ........ 280/504, 511, 432, 479 A

[56] References Cited
UNITED STATES PATENTS

| | | | |
|---|---|---|---|
| 2,904,349 | 9/1959 | Frieberg | 280/479 A |
| 3,479,057 | 11/1969 | Miller | 280/511 |
| 3,677,564 | 7/1972 | Kothman | 280/511 X |
| 3,715,133 | 2/1973 | Schafer | 280/479 A |

FOREIGN PATENTS OR APPLICATIONS
1,106,571  3/1968  Great Britain.................. 280/479 A

*Primary Examiner*—Leo Friaglia

[57] ABSTRACT

A remotely actuatable coupling device having a ball hitch mounted on an agricultural tractor is adapted to accommodate different type hitch-engaging means carried by the tongue of the towed implement. Raising and lowering of the implement tongue is accomplished by the movement of a pick-up bale suspended from the pivotal draft links of the tractor. A keeper, mounted on the tractor and which can be controlled from the operator's station, releasably locks the engaging means to the ball hitch.

8 Claims, 9 Drawing Figures

COUPLING DEVICE

BACKGROUND OF THE INVENTION

This invention relates generally to a coupling device for releasably connecting a trailing vehicle to a leading vehicle and more particularly concerns a remotely actuatable coupling device for connecting an agricultural implement to the drawbar of a tractor.

Numerous coupling devices for connecting a trailing vehicle such as an agricultural implement to a leading vehicle such as a tractor are presently known. One of these presently used coupling devices includes a ball hitch mounted on the leading vehicle and a socket hitch-engaging member and a locking means mounted on the tongue. In lieu of the socket member on the tongue of the towed vehicle, some vehicles have a ring-type coupling member carried on the tongue and a spring loaded clamping member carried by the towing vehicle for grasping the ring. One of the problems heretofore encountered is the fact that a towing vehicle with a ball hitch could not accommodate a ring-type connector on the vehicle to be towed.

At times, especially in the agricultural field, it is advantageous to be able to remotely couple an implement to the tractor. Presently, under normal circumstances, in order to couple the implement to the tractor, the operator must dismount from the tractor and lift the tongue to the drawbar of the tractor and then insert a retaining means and remount the tractor. As agricultural implements have become larger and heavier, it has become increasingly more difficult for the operator to manually lift the tongue and pull it to the drawbar of the tractor for coupling.

SUMMARY OF THE INVENTION

It is therefore an object of this invention to present a coupling device wherein the hitching means on the leading vehicle is adapted to accommodate both socket and ring-type coupling devices on the implement to be towed.

Finally, it is an object of this invention to disclose a coupling device actuatable by an operator seated on a tractor to couple and decouple a towed implement from a tractor drawbar hitch and adapted to operably position the implement tongue for respective engagement and disengagement from the tractor drawbar.

In accordance with the invention, a ball hitch is mounted on the tractor drawbar and a hitch-engaging member, secured to the outer end of the tongue of the implement, is adapted to engage the ball hitch to couple the implement to the tractor. A keeper, pivotal between latching and unlatching positions, is secured to the drawbar of the tractor and in the latch position is held by a remotely controlled trip lever which prevents decoupling of the implement. A pick-up bale, operated by and suspended from the draft links, raises and lowers the tongue of the implement during coupling and decoupling.

BRIEF DESCRIPTION OF THE DRAWINGS

Other objects and advantages of the invention will become apparent upon reading the following detailed description and upon reference to the drawings, in which.

DESCRIPTION OF THE PREFERRED EMBODIMENT

Before entering into the detailed description, it is to be understood that the invention is not limited in its application to the details of construction and arrangements of parts illustrated in the accompanying drawings since the invention is capable of other embodiments and being practiced and carried on in various ways. Also, it is to be understood that the phraseology and terminology employed herein is solely for the purpose of description.

Figure 1:
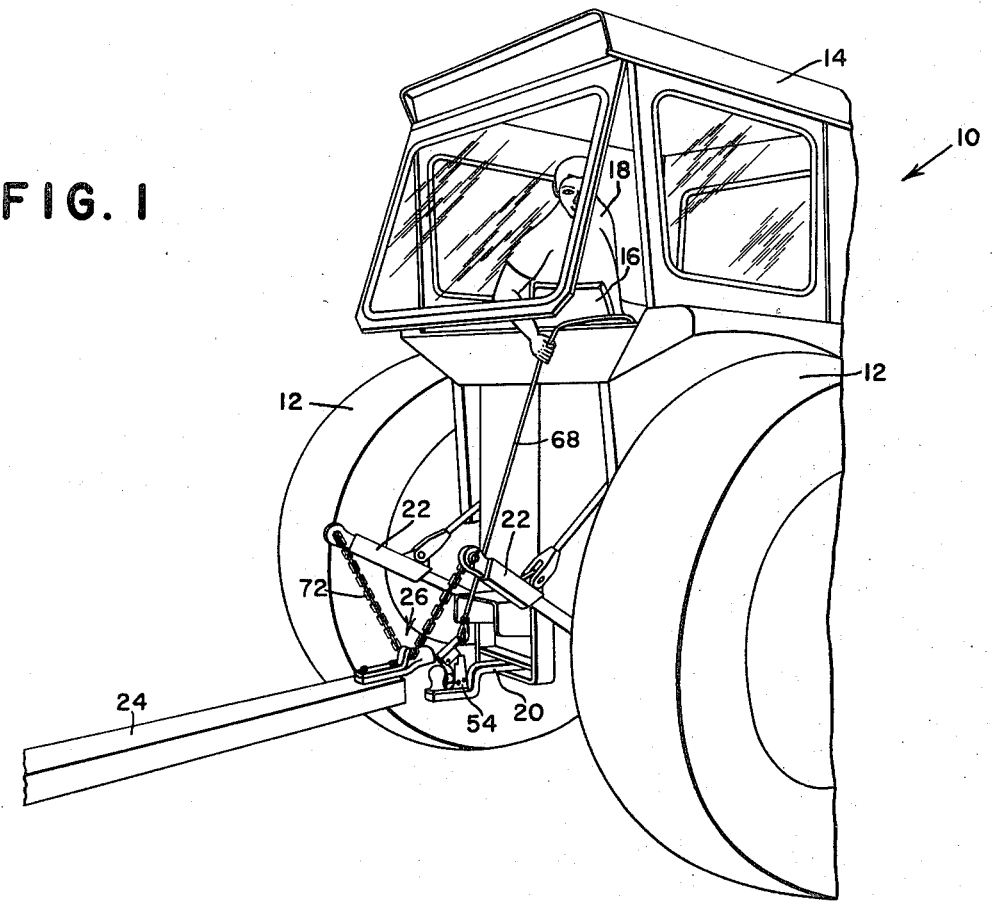
FIG. 1 is a perspective view showing the coupling device of this invention being used by an operator to connect an implement tongue to a tractor drawbar.

Turning now to FIG. 1 of the drawings, there is shown the rear portion of an agricultural tractor noted generally by the numeral 10. The tractor includes rear wheels 12 which support a frame upon which an enclosed cab 14 is mounted. Located within the cab is a seat 16 upon which an operator 18 is seated. Extending rearwardly from the tractor frame is a drawbar 20 and on each side of the drawbar are draft links 22, adapted for pivotal movement. The draft links 22 are controlled in the conventional manner by the operator 18 by means of hydraulic valving having the control levers (not shown) thereof located within the cab. An implement tongue 24 is shown being coupled to the tractor through the use of the coupling device of this invention, noted generally by the numeral 26.

Figure 2:
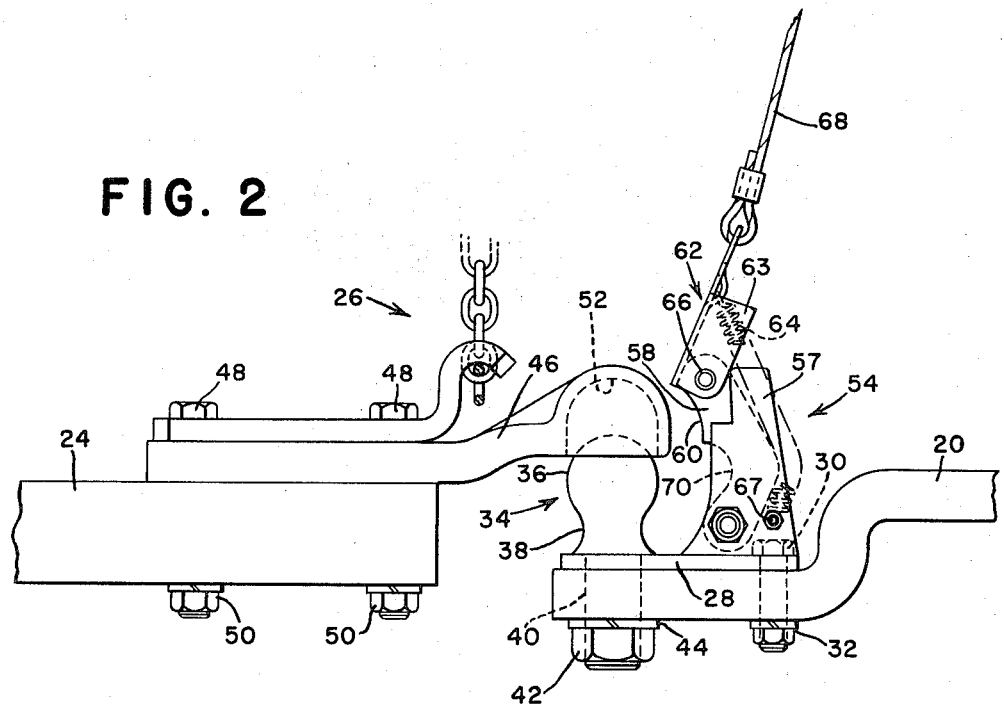
FIG. 2 is a side view of the coupling device of this invention showing the relationship of the components thereof during the coupling procedure and utilizing a socket type of ball-engaging means.
Figure 3:
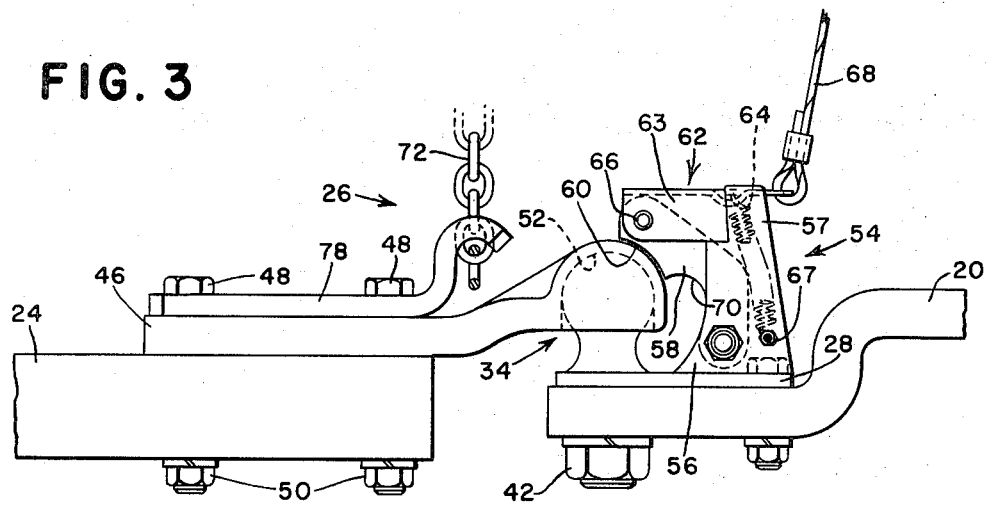
FIG. 3 is a side view of the coupling device showing the relationship of the components when the implement has been coupled to the tractor drawbar.

Turning attention now to FIGS. 2 and 3, the coupling device 26 includes tractor-mounted components and tongue-mounted components which cooperate to attach the implement tongue 24 to the tractor drawbar 20. A horizontal base plate 28 overlays the upper surface of the offset portion of drawbar 20 and is secured thereto at the forward end of the base plate by suitable cap bolts 30 having a nut 32 threadedly engaged in the lower end thereof to hold the base plate in pressure engagement with the upper surface of the drawbar 20. A ball hitch 34 having a head portion 36 and a reduced diameter neck portion 38 includes a threaded shank 40 depending downwardly from the lower end of the neck portion 38 and passing through aligned apertures in the base plate 28 and drawbar 20. The lower end of the shank portion 40 extends beyond the undersurface of drawbar 20 and has threadedly engaged therewith a nut 42 to secure the hitch to the drawbar. A washer 44 may be interposed between the nut and the undersurface of the drawbar 20. As will be appreciated by one skilled in the art, the ball hitch so secured to the drawbar also aids in securing the base plate to the drawbar and prevents lateral movement of the plate relative to the drawbar.

A ball hitch-engaging member 46 is affixed to the implement tongue 24 by means of dual bolts 48 longitudinally spaced apart and passing through aligned apertures in the ball-engaging means and held in pressure contact by nuts 50 threadedly received on the lower end of the bolts 48. The ball engagement member 46 extends forwardly of the forward end of the tongue 24 and in the illustrated embodiment shown in FIGS. 2, 3, and 4, includes an inverted cup-shaped socket 52 adapted to fit over and ride on the head 36 of the ball hitch 34 when the implement is coupled to the tractor. As is well known, the ball hitch and socket association affords limited movement of the tongue in any direction, thus enabling the implement to tilt and rock as it is pulled, thereby eliminating torsional stresses on the drawbar of the tractor and the tongue of the implement.

In order to releasably lock the socket 52 to the hitch ball to prevent decoupling of the implement during operation, a retaining means 54 is provided on the drawbar and includes, forward of the ball hitch 34, a keeper-receiving bracket secured to the base plate and having parallel spaced apart upstanding legs 57 which provide a receptacle for a keeper 58. Keeper 58 is pivoted at its lower end by a bolt passing through aligned apertures in the lower region of legs 57 and is adapted for movement about a substantially horizontal axis between latching and unlatching positions. Keeper 58 extends upwardly from the axis of pivotation and is rearwardly offset or bent to present a first facing surface 60 which, as is shown in the latch position illustrated in FIG. 3, confronts the outer diameter of socket 52 and is arcuate in shape having a radius substantially the same as the outer diameter of the socket. As can be appreciated from a view of FIG. 3, first facing surface 60 of keeper 58 in the latching position is in close proximity to the outer diameter of the socket and hence confines the socket to movement about the ball hitch 34.

Operative locking and unlocking of the pivotal keeper 58 and movement thereof from the latching state to the unlatching state or vice versa is accomplished by the manipulation of a trip release lever 62. The trip release lever 62 includes parallel sides 63 connected and maintained spaced apart by a top 65. The sides are spaced apart a distance equal to the spacing between legs 57 of the receiving bracket and have aligned apertures which are alignable with a transverse aperture in the upper portion of the keeper. A shaft 66, received through the aligned apertures, pivotally connects the trip lever to the keeper. Sides 63 extend forwardly from the point of pivotation and have the forward edge thereof downwardly and forwardly inclined. The upper end of each of the legs 57 is vertically notched at 67 and the rearward edge of each notched portion is downwardly and forwardly inclined to form a complementary surface for the leading edges of the sides 63 in the latch position to inhibit movement of keeper 58. The inclining of these surfaces affords more positive locking of trip release lever 62; that is, in the event that spring 64 should become inoperative, the trip lever would not be as apt to upwardly pivot to permit movement of keeper 58 and decoupling of the implement as would the case if the edges were vertical. It has been found that an inclination of about 3° obtains the desired results.

Figure 4:
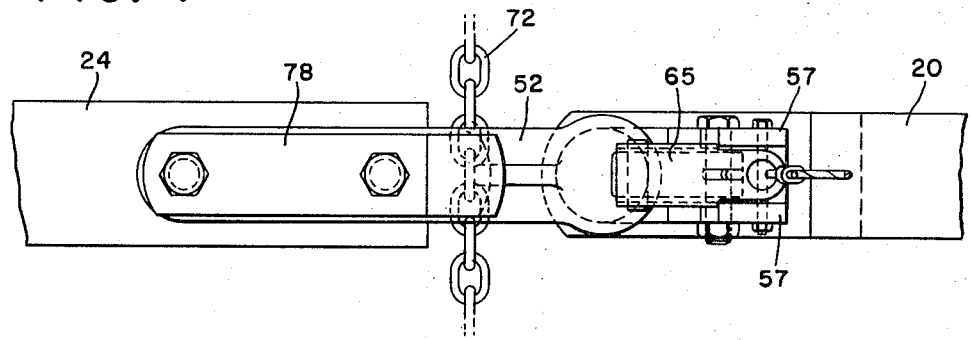
FIG. 4 is a top view of the coupling device of this invention.

As is best visualized in FIG. 4, the top 65 of the trip release lever 62 extends forwardly of the sides intermediate legs 57 to provide a means for gripping trip release lever 62. A helical spring 64 biases the trip lever downwardly and has one end connected between legs 57 by a pin 67 passing between the legs. The opposite end of the spring is connected to the top of trip release lever 62 in any one of numerous conventional ways such as by having a stamped-out eye on the trip release lever through which the upper end of the spring is looped.

Once the details of the component parts of the coupling device 10 of this invention thus far described have been observed, the working cooperation of these components to couple the implement to the tractor is easily understood.

Trip release lever 62 can be manipulated either at the hitch or remotely. The discussion here will concern the direct coupling by an operator adjacent the drawbar while the remote coupling capability of this invention will subsequently be fully discussed. To initiate either coupling or decoupling, the trip lever is manually pivoted upwardly to enable the leading edge of the sides to disengage legs 57. An upwardly, forwardly pulling force on the trip release lever then causes the keeper to pivot forwardly about its lower pivotal axis to enable the ball socket to be either placed on or removed from the ball depending on whether coupling or decoupling is desired. As can be seen in FIG. 1, during the upwardly forwardly pulling of the trip release lever, the bottom edge of the sides thereof act as a guide by riding on the upper rear corner of the notched portion of each of the legs 57.

Assuming that coupling is desired, once the socket 52 has been positioned on ball hitch 34 by the operator, the trip lever is released, and the biasment of spring 64 urges the lever downwardly with the bottom surface of the edge acting as a guide as before mentioned. Concurrently with the downwardly movement of the lever, the keeper pivots rearwardly. As the forward bottom edge of sides 63 clear the rear corners of legs 57, the bias force of the spring pulls the trip lever downwardly such that the leading edge butts against the legs to lock the keeper in the latching position, and the implement is coupled to the tractor and inhibited from movement from the ball by the keeper as previously mentioned.

Figure 5:
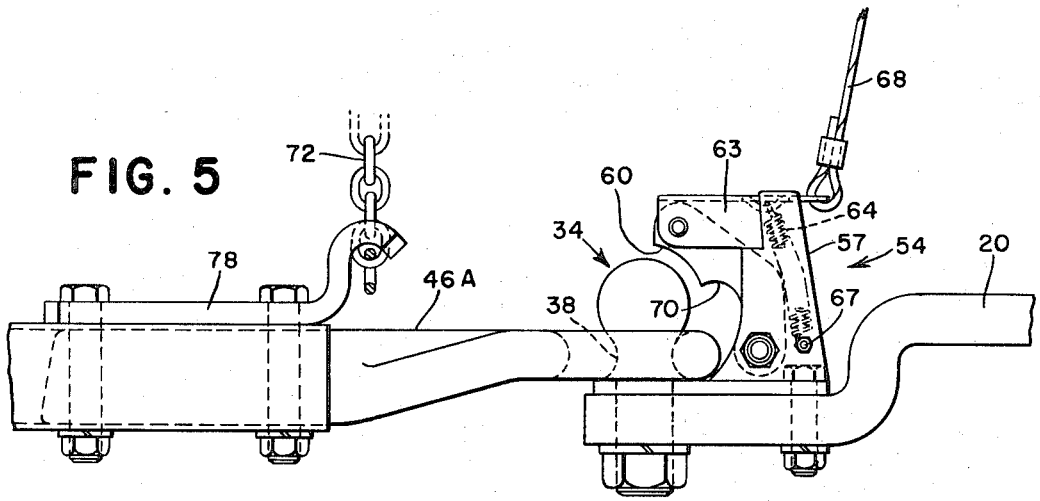
FIG. 5 is a side view of the coupling device of this invention illustrating a ring-type ball-engaging means.

Looking now at FIG. 5, the coupling device of this invention is shown being used with a ring-type hitch engagement member 46A rather than the socket-type previously discussed. The ring-type ball engagement member, rather than riding on the head of ball hitch 34, slips over the ball hitch and during the pulling operation normally bears against the reduced diametered neck 38 of the ball hitch. A second facing surface 70 of the keeper 58 facing the circumference of the ring-type hitch has an arcuate radius substantially the same as the cross section of the ring for the same purposes that facing surface 60 has the same general contour as the outer diameter of socket 52. Thus, in the latch position when the ring-type ball-engaging member 46A is coupled to the ball hitch 52, the keeper 58 confines the upward movement of the engaging member to within specified limits and prevents decoupling of the member from the ball hitch. Also, once the keeper is in the latched position, fore-and-aft chucking of the ring-type tongue end is substantially eliminated. When a vertical or horizontal force is applied to the implement tongue, the ring seats firmly in the slot formed by the rear edge of the legs 57 and the neck of the hitch ball 34 so that there will be little or no relative fore-and-aft movement between the ring and the hitch ball. It is to be noted that the coupling device 26 of this invention accommodates either ring-type or socket hitch ball-engaging members without requiring any modifications.

As before mentioned, the coupling device of this invention is well adapted, especially when used in conjunction with a tractor for remote actuation to enable an operator to couple the implement without leaving the operator's station. In carrying out this aspect of the invention, a pick-up bale 72, shown as a chain in the Figures of the drawings, is suspended from and drooped between the draft links 22 of the tractor as can best be seen in FIG. 1. It is well known that the links are hydraulically controlled and can be pivoted upwardly or downwardly by the operator from the operator's station. The outer end of the draft links 22 are provided with a transverse aperture which receives an eyebolt which carries the respective ends of the chain. A cotter pin or other suitable means can be utilized to retain the eyebolt. Also, suitable washers can be used when desirable.

Figure 6:
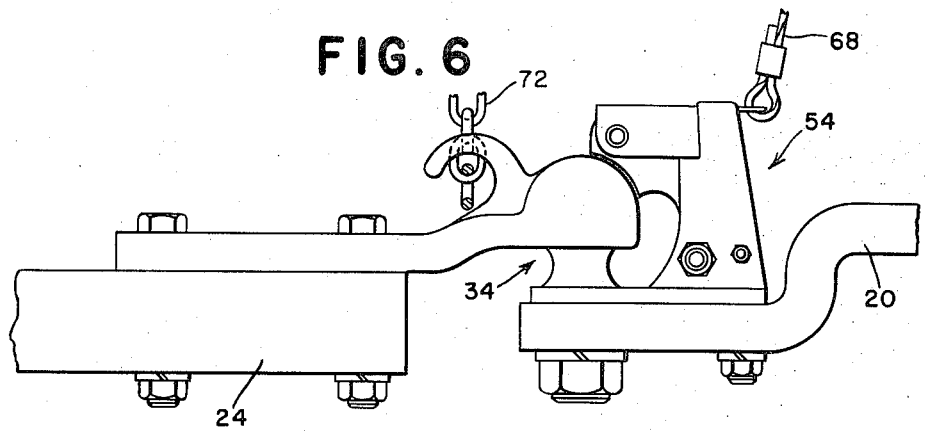
FIG. 6 is a side view of the coupling device of this invention showing an alternate arrangement of the pick-up hook, an element of the invention.

A pick-up hook 78 connected to the tongue 24 of the implement has sufficient clearance to allow entrance of the chain 72. In FIG. 2, the pick-up hook is disposed above the ball-engagement means and utilizes bolts 48 for attachment to the tongue. The pick-up hook shown in FIG. 2 has a hook-opening facing the front of the tongue. It has been found that the pick-up hook may be rotated 180° as shown in FIG. 6 without impairing the operation of the coupling device. For operable manipulation of the trip lever 62, a cord or linkage 68 is extended to within the operator's station as shown in FIG. 1. The trip release lever may be held open by continual pulling force on the linkage 68 or the linkage can be tied to a retainer such as would be well known to one skilled in the art. It should be noted that the latching and unlatching of this coupling device may be actuated remotely by means other than a pull cord such as by hydraulic or electric means.

Figure 7:
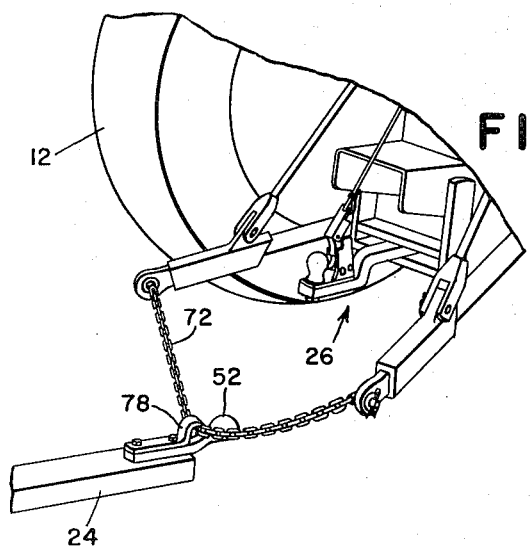
FIGS. 7, 8 and 9 are partial perspective views showing sequential steps in the coupling procedure.
Figure 8:
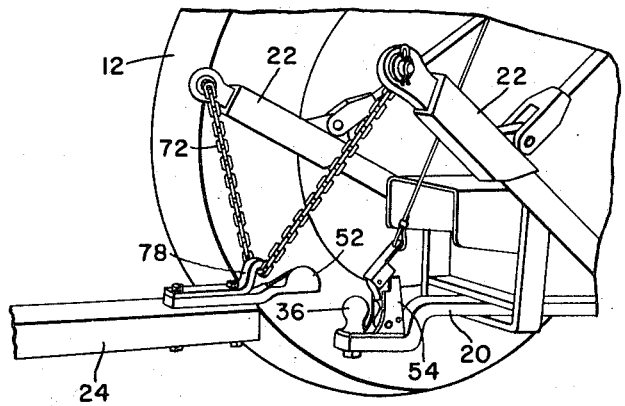
Figure 9:
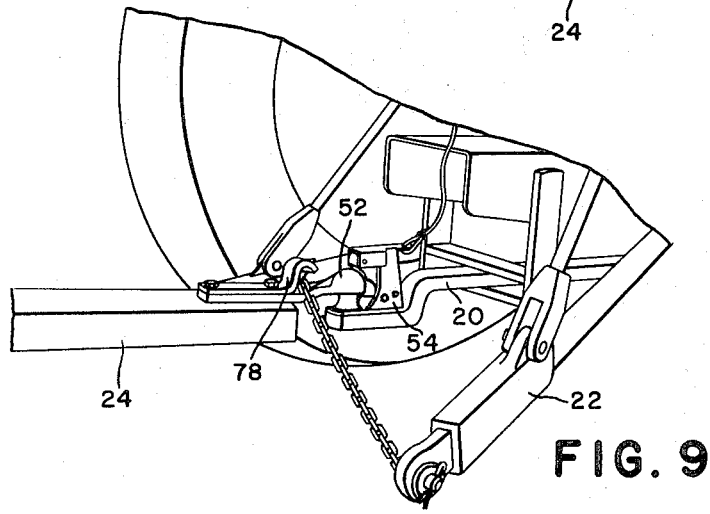

The operation of the coupling device by remote control can best be understood by reference to FIGS. 7, 8 and 9. Looking first at FIG. 7, the operator backs the tractor toward the implement and lowers the draft link 22 until the pick-up bale or chain means 72 engages the pick-up hook. The operator then raises the draft link to lift the tongue and either backs the tractor or, in some instances, by further lifting the draft link, brings socket 52 of the ball-engaging member 46 over the ball hitch 34. Since the pick-up bale 72 is flexible, the weight of the tongue brings about automatic centering of the towed implement tongue as it is lifted. This places the tongue end in a nearly optimum position for engaging the hitch ball. Minor movement of the tractor is usually all that is required to successfully complete the coupling operation. By upward pulling of linkage 68, the keeper is moved to the unlatching position in the manner previously described. Looking now at FIG. 9, the operator then lowers the draft links to permit the socket to ride over the ball hitch and by releasing trip lever 62, enables the keeper to assume the latching position and the sides of the trip lever to butt against legs 57 to lock the keeper in position in the manner previously described. The implement is now completely coupled to the tractor 10 and the operator can then commence his field operations such as plowing, disking or the like. When the field operation has been completed, the implement can be decoupled from the operator's position by the operator moving the keeper to the unlatching position through the use of linkage 68 and then raising the implement tongue from the ball hitch by the use of the pick-up bale.

Although either the socket-type or ring-type tongue end is confined safely and snugly when coupled to the towing drawbar with this device, the full desired unrestricted relative pitch, roll or sway between the towing and towed equipment is permitted without torsionally loading the tongue or drawbar.

Thus it is apparent that there has been provided in accordance with the invention a coupling device that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. An apparatus for releasably coupling a trailing vehicle to a leading vehicle comprising:
   a. a hitch ball mounted on said leading vehicle;
   b. a ball-engaging member affixed to the trailing vehicle and engageable with said hitch ball for coupling the trailing vehicle to the leading vehicle;
   c. a bracket mounted on the leading vehicle;
   d. a keeper pivotally mounted on the bracket for movement about a generally horizontal axis between latching and unlatching positions; said keeper in the latching position when the ball-engaging member is engaged with the hitch ball confining the movement of the ball-engagement member and preventing disengagement thereof from the hitch ball;
   e. means for releasably locking said keeper in the latching position; and
   f. means for lifting said ball-engaging member into engagement with said hitch ball.

2. An apparatus as in claim 1 wherein said bracket is of U-shape and has the bight thereof affixed to the leading vehicle and the legs extending upwardly; said keeper being received between the legs of said bracket and pivotally secured to the lower portion of said legs.

3. An apparatus as in claim 2 wherein said means for releasably locking said keeper in the latching position comprises a tripping lever pivotally carried by said keeper and having elongated side members extending forwardly from the axis of pivotation; said side members having a leading edge which, in the latch position of the keeper, bears against the legs of said bracket to inhibit the movement of the keeper from the latch position; said tripping lever being adapted for pivotal movement upwardly to release said leading edge of said side members from said legs thereby enabling the operator by manipulating the tripping lever to pivot the keeper into the unlatching position to afford decoupling of the trailing vehicle.

4. An apparatus as in claim 3 wherein said tripping lever is spring biased downwardly.

5. A coupling device as in claim 3 further including an elongated linkage member fastened to said trip lever and extending upwardly therefrom to within the the reach of an operator seated on the leading vehicle whereby the trip lever may be actuated remotely to uncouple the trailing vehicle from the leading vehicle.

6. An apparatus as in claim 3 wherein the rearward edge of said legs is downwardly and forwardly inclined to assist in the retention of the trip lever against the legs when the keeper is in the latching position.

7. An apparatus as in claim 6 wherein the leading edge of said side members is complementally inclined downwardly and forwardly to mate with the rearward edge of said legs.

8. An apparatus for releasably coupling the tongue of an implement to the drawbar of a tractor, including power-operated vertically movable draft links, comprising:

a. a hitch ball mounted on said drawbar;
 b. a ball-engaging member affixed to the tongue of said implement and engageable with said hitch ball for coupling the implement to the tractor;
 c. a bracket mounted on the tractor;
 d. a keeper pivotally mounted on the bracket for movement about a generally horizontal axis between latching and unlatching positions; said keeper in the latching position when the ball-engaging member is engaged with the hitch ball confining the movement of the ball-engaging member and preventing disengagement thereof from the hitch ball;
 e. means for releasably locking said keeper in the latching position;
 f. a pickup bale suspended between and from said draft links; and
 g. a pickup hook affixed to the tongue of the implement.

* * * * *